United States Patent
Kawakami et al.

Patent Number: 5,089,448
Date of Patent: Feb. 18, 1992

[54] SILICON NITRIDE SINTERED BODY HAVING EXCELLENT HIGH-TEMPERATURE STRENGTH AND METHOD OF PRODUCING SAME

[75] Inventors: Yasunobu Kawakami; Kagehisa Hamazaki, both of Saitama; Toshihiko Arakawa; Toshiyuki Mori, both of Yokohama, all of Japan

[73] Assignees: Honda Giken Kogyo Kabushiki Kaisha, Tokyo; Tosoh Corporation, Yamaguchi, both of Japan

[21] Appl. No.: 632,423

[22] Filed: Dec. 24, 1990

Related U.S. Application Data

[63] Continuation of Ser. No. 398,478, Aug. 25, 1989, which is a continuation-in-part of Ser. No. 393,381, Aug. 14, 1989.

[30] Foreign Application Priority Data

Aug. 25, 1988 [JP] Japan ............... 63-211117

[51] Int. Cl.$^5$ .............................. C04B 35/58
[52] U.S. Cl. ..................... 501/97; 501/98; 264/65
[58] Field of Search ............ 501/97, 98; 264/65, 264/66

[56] References Cited

U.S. PATENT DOCUMENTS

| | | | |
|---|---|---|---|
| 4,511,402 | 4/1985 | Miura et al. | 501/97 |
| 4,511,525 | 4/1985 | Tsuge et al. | 501/97 |
| 4,517,168 | 5/1985 | Kawahito et al. | 501/97 |
| 4,769,350 | 9/1988 | Nishioka et al. | 501/98 |
| 4,883,776 | 11/1989 | Pyzik et al. | 501/98 |
| 4,904,624 | 2/1990 | Yeckley | 501/97 |
| 4,908,171 | 3/1990 | Clausson | 264/56 |
| 4,980,322 | 12/1990 | Wickel et al. | 501/98 |

FOREIGN PATENT DOCUMENTS

| | | |
|---|---|---|
| 0176315 | 4/1986 | European Pat. Off. |
| 0277753 | 8/1988 | European Pat. Off. |
| 49-21091 | 5/1974 | Japan |
| 0185863 | 8/1988 | Japan |
| 63-185863 | 8/1988 | Japan |

*Primary Examiner*—Karl Group
*Assistant Examiner*—Paul Marcantoni
*Attorney, Agent, or Firm*—Birch, Stewart, Kolasch & Birch

[57] ABSTRACT

A silicon nitride sintered body having a composition of 1.5-3.0 weight % of $Y_2O_3$, 0.1-1.0 weight % of $Al_2O_3$ and balance substantially $Si_3N_4$, a weight ratio of $Y_2O_3/Al_2O_3$ being 2.5 or more, which has a density of 3.0 g/cm$^3$ or more and has a structure in which the minor axes of grains are substantially 6 μm or less. This silicon nitride sintered body is produced by preparing a powder mixture containing $Y_2O_3$ powder, $Al_2O_3$ powder and silicon nitride powder in the above proportions, the silicon nitride powder having an oxygen content of 1.2 weight % or less, a specific surface area of 9-11 m$^2$/g and a metal impurity content of 200 ppm or less; and sintering the powder mixture at a temperature of 1900°-2100° C. and a pressure of 5 kg/cm$^2$ G or more in a nitrogen atmosphere.

4 Claims, 1 Drawing Sheet

20μm

20μm

20μm

SILICON NITRIDE SINTERED BODY HAVING EXCELLENT HIGH-TEMPERATURE STRENGTH AND METHOD OF PRODUCING SAME

CROSS-REFERENCE TO RELATED APPLICATION

This application is a continuation of Ser. No. 07/398,478 filed Aug. 25, 1989, abandoned which is a continuation-in-part of copending application Ser. No. 07/393,381 filed on Aug. 14, 1989, now abandoned, entitled "SILICON NITRIDE SINTERED BODY HAVING EXCELLENT HIGH-TEMPERATURE STRENGTH AND METHOD OF PRODUCING THE SAME", the entire contents of which are hereby incorporated by reference.

BACKGROUND OF THE INVENTION

The present invention relates to a silicon nitride sintered body having excellent high-temperature strength and oxidation resistance.

Silicon nitride sintered bodies are expected to be used as structural ceramics for gas turbine parts, etc. under severe conditions at high temperatures, because of their high strength, heat resistance, thermal shock resistance wear resistance, oxidation resistance, etc. However, since the silicon nitride itself is a material which cannot be easily sintered, various sintering aids are added to increase its density. The sintering aids tend to form glass phases of low-melting points in the boundaries of silicon nitride grains, resulting in the deterioration of high-temperature strength of the silicon nitride. Accordingly, the following attempts were proposed.

(1) Adding oxides of rare earth elements such as yttrium oxide.
(2) Adding oxides of rare earth elements such as yttrium oxide together with other oxides such as aluminum oxide (for instance, Japanese Patent Publication No. 49-21091).
(3) Adjusting the formulation of yttrium oxide, aluminum oxide and silicon nitride to improve an oxidation resistance at 1400° C. (Japanese Patent Laid-Open No. 63-185863).

However, since these methods suffer from the following problems, they are not practical methods.

Specifically speaking, the method (1) of adding yttrium oxide solves the above problem (formation of low-melting point glass phases). In fact, since the boundaries of silicon nitride grains are bonded together by a high-viscosity glass or crystalline compositions such as $Si_3N_4 \cdot Y_2O_3$, the high-temperature strength and high-temperature creep resistance of the silicon nitride sintered body are not likely to be deteriorated. In this respect, this method is effective to some extent. However, the resulting silicon nitride sintered body shows insufficient high-temperature strength, etc. and the sintering of the silicon nitride is difficult, meaning that pressureless sintering cannot be applied.

In the method (2) where yttrium oxide and aluminum oxide are added the sintering is accelerated, and high-density, high-strength sintered bodies can be obtained even by pressureless sintering. However, since the resulting silicon nitride sintered bodies suffer from a severe decrease in high-temperature strength, dense sintered bodies having excellent high-temperature strength cannot be obtained without using special sintering methods such as hot pressing after a crystallization treatment.

With respect to sintered bodies obtained by the method (3) of adjusting the formulation of yttrium oxide, aluminum oxide and silicon nitride to improve the oxidation resistance at 1400° C., the amounts of additives are extremely small. Accordingly, to achieve high density, a sintering temperature of 1850° C. or higher is needed, resulting in extraordinary growth of crystal grains in the structure of the resulting sintered bodies. Therefore, although the oxidation resistance and strength at 1400° C. are not lowered, they do not have sufficiently improved strength at room temperature.

OBJECT AND SUMMARY OF THE INVENTION

Therefore, an object of the present invention is to provide a silicon nitride sintered body having excellent oxidation resistance and high strength at a high temperature.

Another object of the present invention is to provide a method of producing such a silicon nitride sintered body.

As a result of intense research in view of the above objects, the inventors have paid attention to the method (3) and found that by controlling the grain growth in the structure of the sintered body such that the crystal grains in the structure have minor axes which are at most substantially 6 $\mu$m or less, silicon nitride ceramics having improved strength not only at room temperature but also at 1400° C. can be obtained. The present invention is based upon this finding.

Thus, the silicon nitride sintered body according to the present invention has a composition comprising 1.5–3.0 weight % of $Y_2O_3$, 0.1–1.0 weight % of $Al_2O_3$ and balance substantially $Si_3N_4$, a weight ratio of $Y_2O_3/Al_2O_3$ being 2.5 or more, which has a density of 3.0 $g/cm^3$ or more and has a structure in which the minor axes of grains are substantially 6 $\mu$m or less.

The method of the present invention comprises the steps of preparing a powder mixture comprising 1.5–3.0 weight % of $Y_2O_3$ powder, 0.1–1.0 weight % of $Al_2O_3$ powder and balance substantially silicon nitride powder, a weight ratio of $Y_2O_3/Al_2O_3$ being 2.5 or more, the silicon nitride powder having an oxygen content of 1.2 weight % or less, a specific surface area of 9–11 $m^2/g$ and a metal impurity content of 200 ppm or less; and sintering the powder mixture at a temperature of 1900°–2100° C. and a pressure of 5 $kg/cm^2$ G or more in a nitrogen atmosphere.

DETAILED DESCRIPTION OF THE INVENTION

Figure 1:
FIG. 1 is a scanning-type electron photomicrograph showing the microstructure in the rupture surface of the silicon nitride sintered body in Example 2.

In the present invention, the content of $Y_2O_3$ is 1.5–3.0 weight %. When the content of $Y_2O_3$ is higher than 3.0 weight %, the resulting sintered body has a low oxidation resistance at a high temperature. On the other hand, when the content of $Y_2O_3$ is lower than 1.5 weight %, the resulting sintered body cannot be made fully dense, failing to meet the requirements of oxidation resistance and strength. With respect to the content of $Al_2O_3$, it is 0.1-1.0 weight %. When it is higher than 1.0 weight %, the resulting sintered body has poor oxidation resistance and high-temperature strength. On the other hand, when it is lower than 0.1 weight %, the resulting sintered body is not fully dense like in the case of $Y_2O_3$, failing to achieve the desired oxidation resistance and strength.

With respect to the weight ratio of $Y_2O_3/Al_2O_3$, it should be 2.5 or more. When this weight ratio is lower than 2.5, the resulting sintered body does not have a sufficient oxidation resistance at 1400° C.

The silicon nitride sintered body of the present invention should have a density of 3.0 g/cm$^3$ or more, which corresponds to about 93% or more of the theoretical density. When the density is lower than this level, sufficient strength cannot be achieved.

When the extraordinary grain growth takes place such that the minor axes of grains become substantially more than 6 μm in the sintered body structure, the ununiformness of the structure increases, resulting in an increase in the strain of the sintered body. As a result, the residual stress increases in the sinter body matrix. The residual stress generated in the matrix accelerates the propagation of cracks in the sintered body, resulting in a decrease in the mechanical strength of the sintered body. Thus, by suppressing the extraordinary grain growth in the structure, thereby providing the sintered body with a fine structure, the sintered body can have a high strength not only at room temperature but also at a high temperature.

To prevent the extraordinary grain growth, $Y_2O_3$ and $Al_2O_3$ should be added such that the above conditions are met, and the silicon nitride powder used as a starting material should meet the following conditions:

(a) Oxygen content of 1.2 weight % or less;
(b) Specific surface area of 9-11 m$^2$/g; and
(c) Metal impurity content of 200 ppm or less.

It is necessary to sinter the powder mixture as a starting material in a nitrogen atmosphere under the following conditions:

(d) A temperature of 1900°-2100° C., and
(e) A pressure of 5 kg/cm$^2$ G or more.

When the oxygen content of the silicon nitride powder exceeds 1.2 weight %, high-oxygen content phases are formed in the grain boundaries. When the total content of metal impurities exceeds 200 ppm, impurity phases appear in the grain boundaries, so that the sintered body becomes easily softened at a high temperature. Thus, the sintered body has a low oxidation resistance.

Further, even within the composition range of the present invention, when the specific surface area of the silicon nitride powder exceeds 11 m$^2$/g, the extraordinary grain growth takes place such that the minor axes of grains in the sintered body structure exceed substantially 6 μm. On the other hand, when the specific surface area is lower than 9 m$^2$/g, sufficient density cannot be achieved in the resulting sintered body.

In the method of the present invention, the sintering temperature should be 1900°-2100° C. When the sintering temperature is too low, the sintered body cannot be made fully dense. On the other hand, when the sintering temperature is too high, the silicon nitride undesirably tends to be decomposed.

The sintered body of the present invention can generally be produced by the following method:

First, $Si_3N_4$ powder, $Y_2O_3$ powder and $Al_2O_3$ powder meeting the above conditions are mixed in proper proportions. It is preferable that the $Si_3N_4$ powder has an average particle size of about 0.3-0.4 μm, that the $Y_2O_3$ powder has an average particle size of about 0.5-2 μm, and that the $Al_2O_3$ powder has an average particle size of about 0.4-0.5 μm. The mixing of these powders may be conducted by a ball mill, a dispersing machine, etc.

The resulting powder mixture is compressed to form a green body or a pressed body by a die press, a cold isostatic press (CIP), etc. In the process of pressing, pressing aids, such as a polyvinyl alcohol solution, etc. may be added, if necessary.

The sintering of the green body can be conducted properly by a known high pressure method. For instance, a gas pressure sintering method, a hot isostatic pressing method (HIP), etc. can be used.

The silicon nitride sintered body of the present invention thus obtained has a density of 3.0 g/cm$^3$ or more, and the minor axes of grains in the structure are at most substantially 6 μm or less.

It is not necessarily clear why the effects of the present invention can be obtained by the silicon nitride sintered body meeting the above conditions, but it may be presumed as follows:

With respect to the composition, even though the content of aluminum oxide is 0.1-1.0 weight %, the high-temperature strength of the sintered body is deteriorated when the content of yttrium oxide exceeds 3.0 weight %. This presumably is due to the fact that since the grain boundaries containing these additives are not crystallized but made glassy, oxidation proceeds through the grain boundaries, resulting in a decrease in the high-temperature strength.

In addition, the extraordinary grain growth in the sintered body structure and the absolute value of the residual stress in the sintered body have a close correlation. When there is the extraordinary grain growth in the sintered body structure, the absolute value of the residual stress exceeds 45 MPa, resulting in the acceleration of propagation of cracks in the sintered body. As a result, the mechanical strength of the sintered body cannot be fully improved.

Incidentally, even though the contents of the sintering aids are within the above ranges, the absolute value of the residual stress of the sintered body becomes too large when the silicon nitride powder has an excessive specific surface area. Thus, an uneven stress field is generated in the grain boundaries, inducing an unevenness in the sintered body structure.

For the above reasons, in the ranges of the present invention to which yttrium oxide, aluminum oxide and silicon nitride are restricted, the dense sintered body has crystallized grain boundaries and a fine structure. As a result, the sintered body has a high strength and a high creep resistance even at a high temperature of 1400° C.

Preferred ranges for various features of the invention are set forth below.

|  | General Range | Preferred Range | More Preferred Range |
|---|---|---|---|
| Composition and Properties |  |  |  |
| $Y_2O_3$ | 1.5-3.0 wt. % | 2.0-3.0 wt. % | 2.0-2.8 wt. % |
| $Al_2O_3$ | 0.1-1.0 wt. % | 0.4-1.0 wt. % | 0.4-0.8 wt. % |
| $Y_2O_3/Al_2O_3$ | 2.5 or more | — | — |
| $Si_3N_4$ | Substantially balance | — | — |
| Oxygen Content | 1.2 wt. % or less | 0.8-1.2 wt. % | 0.8-1.1 wt. % |
| Specific | 9-11 m$^2$/g | — | — |

-continued

|  | General Range | Preferred Range | More Preferred Range |
|---|---|---|---|
| Surface Area | | | |
| Metal Impurities | 200 ppm or less | 150 ppm or[1] less | — |
| Density | 3.0 g/cm$^3$ or more | 3.10–3.25 g/cm$^3$ | — |
| Minor Axes of Grains | 6 μm or less | — | — |

TABLE 1

| | Composition | | | | | Silicon Nitride Sintered Body | | | | |
|---|---|---|---|---|---|---|---|---|---|---|
| | | | | Si$_3$N$_4$ | | Absolute Value of Residual Stress (MPa) | Density (g/cm$^3$) | Weight Gain by Oxidation (1400° C., 100 hr) (mg/cm$^2$) | High-Temp. Strength (1400° C.) (kg/mm$^2$) | Strength at Room Temp. (kg/mm$^2$) | Maximum Value of Minor Axes of Grains (μm) |
| No. | Y$_2$O$_3$ (wt. %) | Al$_2$O$_3$ (wt. %) | Y$_2$O$_3$/ Al$_2$O$_3$ (wt. ratio) | Oxygen Content (wt. %) | Specific Surface Area (m$^2$g) | | | | | | |
| Example | | | | | | | | | | | |
| 1 | 2.5 | 1.0 | 2.5 | 1.2 | 10 | 43 | 3.19 | 0.09 | 71.5 | 75.0 | 6.0 |
| 2 | 2.5 | 1.0 | 2.5 | 0.9 | 10 | 41 | 3.17 | 0.10 | 80.0 | 83.5 | 5.8 |
| 3 | 2.5 | 0.5 | 5.0 | 1.0 | 10 | 40 | 3.18 | 0.03 | 85.0 | 87.5 | 5.5 |
| 4 | 3.0 | 1.0 | 3.0 | 1.0 | 10 | 44 | 3.23 | 0.09 | 69.3 | 73.0 | 5.7 |
| 5 | 2.5 | 0.1 | 25.0 | 1.0 | 10 | 42 | 3.16 | 0.10 | 70.0 | 74.0 | 6.0 |
| Comparative Example | | | | | | | | | | | |
| 1 | 2.5 | 1.0 | 2.5 | 1.0 | 8 | 55 | 2.78 | 1.85 | 23.0 | 34.3 | 5.0 |
| 2 | 2.5 | 1.0 | 2.5 | 1.0 | 12 | 50 | 3.22 | 0.08 | 48.3 | 55.0 | 14.0 |
| 3 | 2.5 | 1.2 | 2.1 | 1.0 | 10 | 54 | 3.23 | 0.22 | 32.3 | 40.0 | 5.9 |
| 4 | 4.0 | 1.0 | 4.0 | 1.0 | 10 | 53 | 3.23 | 0.35 | 35.5 | 41.5 | 5.5 |
| 5 | 2.5 | 0.05 | 50.0 | 1.0 | 10 | 54 | 2.42 | 2.54 | 23.0 | 39.0 | 4.5 |
| 6 | 2.5 | 1.0 | 2.5 | 1.3 | 10 | 50 | 3.22 | 0.19 | 34.5 | 57.0 | 5.8 |
| 7 | 2.5 | 1.0 | 2.5 | 1.0 | 10 | 55 | 2.80 | 1.90 | 20.0 | 39.5 | 5.0 |

| Production Conditions | | | |
|---|---|---|---|
| Sintering Temperature | 1900–2100° C. | 1950–2050° C. | — |
| Sintering Pressure | 5 kg/cm$^2$ G or more | 10–20 kg/cm$^{2(2)}$ | — |

Note
[1] Lower limit should be as low as possible theoretically. However, at present about 50 ppm is a possible lower limit.
[2] This range is applicable when a gas pressure sintering method is utilized.

The sintering conditions in the Examples and Comparative Examples were 10 kg/cm$^2$G and the gas pressure sintering method was utilized.

Examples 1–5, Comparative Examples 1–7

Silicon nitride powder synthesized by a thermal decomposition method of silicon imide (manufactured by Tosoh Corporation, oxygen content: 0.9–1.3 weight %, total amount of metal impurities: 80 ppm, BET specific surface area: 8–12 cm$^2$/g), yttrium oxide powder (manufactured by Mitsuibishi Chemical, Ltd., fine powder grade), and aluminum oxide powder (manufactured by Sumitomo Chemical Co., Ltd., AKP 30) were used, and they were mixed in proportions shown in Table 1 in a pot mill made of silicon nitride for 24 hours. Each mixture thus obtained was subjected to cold isostatic pressing at a pressure of 1500 kg/mm$^2$ to form a green body of 50 mm×30 mm×5 mm. The green body was embedded in boron nitride powder and sintered at 1950° C. in Examples 1–5 and Comparative Examples 1–6, and 1850° C. in Comparative Example 7, each in a nitrogen atmosphere for 4 hours.

With respect to each sintered body thus produced, a 3-point bending test was conducted according to JIS R 1601-1981 at room temperature and 1400° C. Further, by measuring a weight gain by oxidation at 1400° C. for 100 hours its oxidation resistance was evaluated. The results are shown in Table 1.

Figure 2:
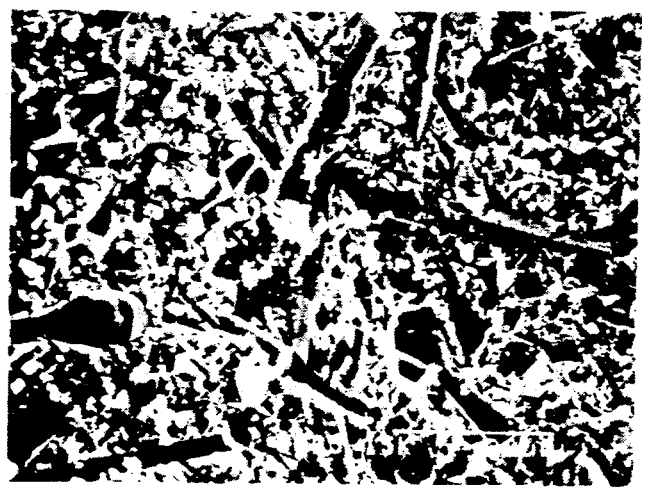
FIG. 2 is a scanning-type electron photomicrograph showing the microstructure in the rupture surface of the silicon nitride sintered body in Comparative Example 2.

As examples of the sintered body structure, FIGS. 1 and 2 respectively show scanning-type electron photomicrographs of rupture surfaces of the sintered bodies in Example 2 and Comparative Sample 2. It is clear from FIG. 1 that the silicon nitride sintered body of the present invention has minor axes of grains which are substantially 6 μm or less.

As described above in detail, since the silicon nitride sintered body of the present invention has extremely high oxidation resistance and strength at such a high temperature as 1400° C., it can be used in a wider variety of applications than the conventional silicon nitride sintered bodies. Particularly, the silicon nitride sintered body of the present invention is an engineering ceramic material with excellent high-temperature strength, which is suitable for structural members such as turbine parts, etc.

What is claimed is:

1. A silicon nitride body having a composition consisting essentially of 2.0–2.8 weight % of Y$_2$O$_3$, 0.4–1.0 weight % of Al$_2$O$_3$ and balance substantially Si$_3$N$_4$, the weight ratio of Y$_2$O$_3$/Al$_2$O$_3$ being 2.5–7, said Si$_3$N$_4$ being added as silicon nitride powder having an oxygen content of 0.8–1.1 weight %, a specific surface area of 9 ∝ 11 m$^2$/g, and metal impurity content of 200 ppm or less, said sintered body having a density of 3.0 g/cm$^3$ or more, a structure in which the minor axes of grains are substantially 6 μm or less, and a high-temperature strength of about 80 kg/mm$^2$ or more.

2. The silicon nitride body of claim 1, wherein said composition consists essentially of 2.5 weight % of Y$_2$O$_3$, 1.0 weight % of Al$_2$O$_3$ and balance substantially Si$_3$N$_4$, a weight ratio of Y$_2$O$_3$/Al$_2$O$_3$ of 2.5, said Si$_3$N$_4$ being added as silicon nitride powder having an oxygen content of 0.9 weight %, a specific surface area of 10 m$^2$/g, and a metal impurity content of 200 ppm or less, said sintered body having a density of 3.17 g/cm$^3$, and having a structure in which the maximum value of minor axes of grains is 5.8 μm.

3. The silicon nitride body of claim 1, wherein said composition consists essentially of 2.5 weight % of Y$_2$O$_3$, 0.5 weight % of Al$_2$O$_3$ and balance substantially Si$_3$N$_4$, a weight ratio of Y$_2$O$_3$/Al$_2$O$_3$ of 5.0, said Si$_3$N$_4$ being added as silicon nitride powder having an oxygen content of 1.0 weight %, a specific surface are of 10 m$^2$/g, and a metal impurity content of 200 ppm or less, said sintered body having a density of 3.18 g/cm$^3$, and having a structure in which the maximum value of minor axes of grains are 5.5 μm.

4. A method of producing a silicon nitride sintered body having a structure in which the minor axes of grains are substantially 6 μm or less, comprising the steps of:

preparing a powder mixture consisting essentially of 2.0-2.8 weight % of Y$_2$O$_3$ powder, 0.4-1.0 weight % of Al$_2$O$_3$ powder and balance substantially silicon nitride powder, the weight ratio of Y$_2$O$_3$/Al$_2$O$_3$ being 2.5-7, said silicon nitride powder having an oxygen content of 0.8-1.1 weight %, a specific surface area of 9-11 m$^2$/g, and a metal impurity content of 200 ppm or less; and sintering said powder mixture at a temperature of 1900°-2100° C. and a pressure of 5 kg/cm$^2$ G or more in a nitrogen atmosphere, thereby producing a silicon nitride sintered body exhibiting a high-temperature strength of about 80 kg/mm$^2$ or more.

* * * * *